US007675880B2

(12) United States Patent  
Kim

(10) Patent No.: US 7,675,880 B2
(45) Date of Patent: Mar. 9, 2010

(54) POWER ESTIMATING METHOD IN WIRELESS SYSTEM

(75) Inventor: Seung-Min Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 841 days.

(21) Appl. No.: 10/995,304

(22) Filed: Nov. 24, 2004

(65) Prior Publication Data

US 2005/0111396 A1  May 26, 2005

(30) Foreign Application Priority Data

Nov. 26, 2003  (KR)  ............... 10-2003-0084654

(51) Int. Cl.
H04B 7/185 (2006.01)
(52) U.S. Cl. ............................................. 370/318
(58) Field of Classification Search ............... 370/318, 370/209, 335
See application file for complete search history.

(56) References Cited

U.S. PATENT DOCUMENTS

| 6,219,340 | B1  |   | 4/2001 | Cutler et al. |         |
| 6,519,227 | B1  |   | 2/2003 | Koizumi       |         |
| 6,552,996 | B2  | * | 4/2003 | Kim et al.    | 370/209 |
| 6,778,588 | B2  | * | 8/2004 | Li et al.     | 375/130 |
| 6,859,445 | B1  | * | 2/2005 | Moon et al.   | 370/335 |
| 7,248,698 | B2  | * | 7/2007 | Hepler        | 380/268 |
| 7,251,229 | B2  | * | 7/2007 | Montojo et al.| 370/335 |
| 2002/0085522 | A1 |   | 7/2002 | Huber         |         |
| 2003/0076798 | A1 |   | 4/2003 | Montojo et al.|         |
| 2004/0004953 | A1 |   | 1/2004 | Koizumi et al.|         |
| 2005/0190688 | A1 | * | 9/2005 | Batut et al.  | 370/203 |

FOREIGN PATENT DOCUMENTS

| JP | 2000-036802   | 2/2000  |
| JP | 2000-216754   | 4/2000  |
| JP | 2000-134180   | 5/2000  |
| JP | 2001-189711   | 7/2001  |
| JP | 2003-060620   | 2/2003  |
| JP | 2003-143069   | 6/2003  |
| JP | 2004-080784   | 3/2004  |
| WO | 01/97421      | 12/2001 |
| WO | 02/49221      | 6/2002  |
| WO | WO 03/096737 A | 11/2003 |

OTHER PUBLICATIONS

Birgenheier, R.A., "Measuring waveform quality, code-domain power, time offsets and phase offsets of CDMA signals", Instrumentation and Measurement Technology Conference, Brussels, Belgium, Jun. 4-6, 1996, pp. 615-621.
Japanese Office Action dated Aug. 16, 2006.

* cited by examiner

Primary Examiner—Vincent P Harper
Assistant Examiner—Gary Au
(74) Attorney, Agent, or Firm—KED & Associates LLP

(57) ABSTRACT

A system and method for estimating power of a wireless system simultaneously estimates and displays a code domain power and a time domain power in the system which may be a wireless communication system that mixes TDMA and CDMA methods such as WCDMA TDD and TD-SCDMA. The method includes designating a section where an output power is to be estimated, estimating a time domain power in the designated section; estimating a code domain power in the designated section, and displaying the estimated time domain power and the code domain power on a display unit.

23 Claims, 4 Drawing Sheets

| CODE LENGTH | CHANNEL | | | | | | | | | | | | | | | |
|---|---|---|---|---|---|---|---|---|---|---|---|---|---|---|---|---|
| L=16 | 0 | 1 | 2 | 3 | 4 | 5 | 6 | 7 | 8 | 9 | 10 | 11 | 12 | 13 | 14 | 15 |
| L=8 | 0 | | 1 | | 2 | | 3 | | 4 | | 5 | | 6 | | 7 | |
| L=4 | 0 | | | | 1 | | | | 2 | | | | 3 | | | |

POWER ESTIMATING METHOD IN WIRELESS SYSTEM

BACKGROUND OF THE INVENTION

1. Field of the Invention

The present invention generally relates to wireless communications, and more particularly to estimating power in a wireless mobile communication system.

2. Description of the Related Art

A multiple access method performs wireless communications by allowing a plurality of users to share time and frequency simultaneously. Multiple access methods include frequency division multiple access (FDMA) methods, time division multiple access (IDMA) methods, and code division multiple access (CDMA) methods. The FDMA method allocates one frequency per user.

The TDMA method is performed by adding a time division notion to a frequency division notion of the FDMA method. Also, in TDMA, a voice signal is converted into a digital frame or packet to be transmitted, and each channel is divided into a short time period.

The CDMA method is a spread-spectrum technique, in which a plurality of users simultaneously share time and frequency. Each user is allocated a specific code, and a transmitter and receiver have to be synchronized in order to modulate and demodulate code spread data.

Generally, functions performed in TDMA/CDMA methods are certified by estimating a quality of output power of a base station or mobile station. Time domain power is estimated in the TDMA method and a code domain power is estimated in the CDMA method, and equipment for estimating time domain power is different from equipment for estimating code domain power. Therefore, conventionally, equipment for estimating the time domain power can only be used in a TDMA system, and equipment for estimating code domain power can only be used in a CDMA system.

In order to measure the quality of output power, in a CDMA method a certain allocated frequency band is divided into different codes to distinguish respective channels. At this time, transmission frequency and receiving frequency are different from one another. A duplexer may therefore be used at a high frequency end. In contrast, in a TDMA method, the same frequency band is allocated for transmitting and receiving data, and transmission and reception channels are distinguished by time division switching. A time division switch is used at the high frequency end during this technique.

Certifying a function of a mobile communication system by estimating the quality of output power of a base or mobile stations is important. This process is widely used over the entire mobile communication industry, for example, to perform quality testing during the manufacture of a mobile station, to measure communication quality between base and mobile stations, and to operate one or more radio resources.

FIG. 1 is a graph showing a time domain power measurement in a global system for mobile communication (GSM) method employing TDMA. In the graph, a frequency band allocated to an up-link and a down-link in the GSM method is divided into each channel, and the divided channel is again divided into time slots using a TDMA method. That is, the channel is divided into time slots (or burst periods), the most basic unit in TDMA.

The up-link denotes a transmission path from a mobile station to a base station, and the down-link denotes a transmission path from a base station to a mobile station. One TDMA frame is divided into 8 time slots (TS0-TS7), and power is estimated for each time slot based on this arrangement. Power is represented by dBm units. Time slot TS0 is allocated to the down-link and is used to transmit a data signal or operational information from a base station for controlling a mobile station. The remaining time slots TS1-TS7 are allocated to the up-link and down-link, and are used to detect and display levels operated on each channel.

FIG. 2 is a graph showing a code domain power measurement performed in an IS-95 method. In this method, 64 (0-63) channels are used and each channel has an output power which is estimated and displayed in the graph. The code domain power is represented in dB units. In estimating and displaying the code domain power based on a CDMA method, the signal power of each channel and noise power is simultaneously estimated. In FIG. 2, channels 3, 6 and 59 are shown as having power which is greatly decreased compared to the power of the remaining channels, which, for example, have not received data to be transmitted. The measurement results are displayed together on one screen, so that a signal-to-noise ratio (SNR or S/N) can be easily recognized.

In order to distinguish channels in the CDMA method, a Walsh code is generally used. Because multiple users use the same frequency in a CDMA method, power management is necessary. Accordingly, base station power is estimated by being distinguished based on Walsh codes, and a code domain power is estimated by comparing a non-operational code power with a total power, thereby properly distributing power. This also reduces interference between channels and maximizes capacity of a section.

FIG. 3 is a chart showing a state of a channel allocated by a Walsh code length in a general CDMA method. When the Walsh code length is 4 (L=4), 4 channels 0-3 are allocated. When the Walsh code length is 8 (L=8), 8 channels 0-7 are allocated. And, when the Walsh code length is 16 (L=16), 16 channels 0-15 are allocated. From these chart entries, it can be seen that channel allocation is proportional to the Walsh code length, L.

As previously mentioned, in order to estimate transmitting power in a CDMA system, code domain power estimation for estimating an output power per channel is performed. However, because transmitting frequencies of the base station and mobile station are different, and because the TDMA method was not introduced for each CDMA channel, no method for estimating the code domain power in a TDMA method has heretofore been proposed. Moreover, a method for estimating the time domain power in a CDMA method has not been proposed.

Therefore, there is a problem in that a method for performing power estimation in a code region in next-generation mobile communication systems where TDMA and CDMA methods are mixed, such as but not limited to wideband CDMA time division duplex (WCDMA TDD) systems and time division synchronous CDMA (TD-SCDMA) systems.

SUMMARY OF THE INVENTION

An object of the invention is to solve at least one of the above problems and/or disadvantages and to provide one or more of the advantages described hereinafter.

Another object of the present invention is to provide a system and method which simultaneously estimates and preferably displays code domain power and time domain power in a mixed wireless communication system such as but not limited to one which mixes TDMA and CDMA methods, e.g., WCDMA TDD methods and TD-SCDMA methods.

To achieve these and other objects and advantages, the present invention provides a power estimating method of a wireless system comprising the steps of: designating a section where an output power is to be estimated; estimating a time domain power of the designated section; estimating a code domain power of the designated section; and displaying the estimated time domain power and the code domain power on a display unit. Preferably, the wireless system is a mixed system of a CDMA method and a TDMA method such as a TD-SCDMA method and a WCDMA TDD method. Also, preferably, not only the time domain power and the code domain power but also a channel name, an SF, a code number, a time slot number, and etc. are displayed on the display unit by a market. The channel name can be displayed by an overwriting on a code channel power level, or can be selectively omitted.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

DETAILED DESCRIPTION OF THE PREFERRED EMBODIMENTS

The present invention is a system and method for measuring power in a mixed wireless mobile communication system, including but not limited to one which mixes TDMA and CDMA methods. The system and method are especially well suited to measuring power in a WCDMA TDD method or a TD-SCDMA method which are expected to be used in the future.

WCDMA TDD and TD-SCDMA methods use one frequency band since an uplink and downlink are divided by time division. A paired spectrum wherein the up link and down link are divided by frequency division has been preferred. However, it is difficult to assign the paired spectrum universally. Therefore, in the future an unpaired spectrum may be used additionally and a TDD method requiring one frequency band may be applied thereto.

Figure 1:
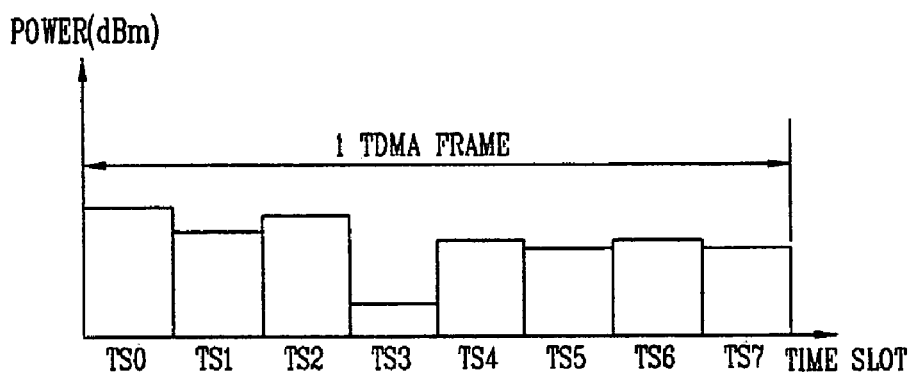
FIG. 1 is a graph showing a time domain power measurement obtained in a mobile communication system implementing a related-art TDMA method.
Figure 2:
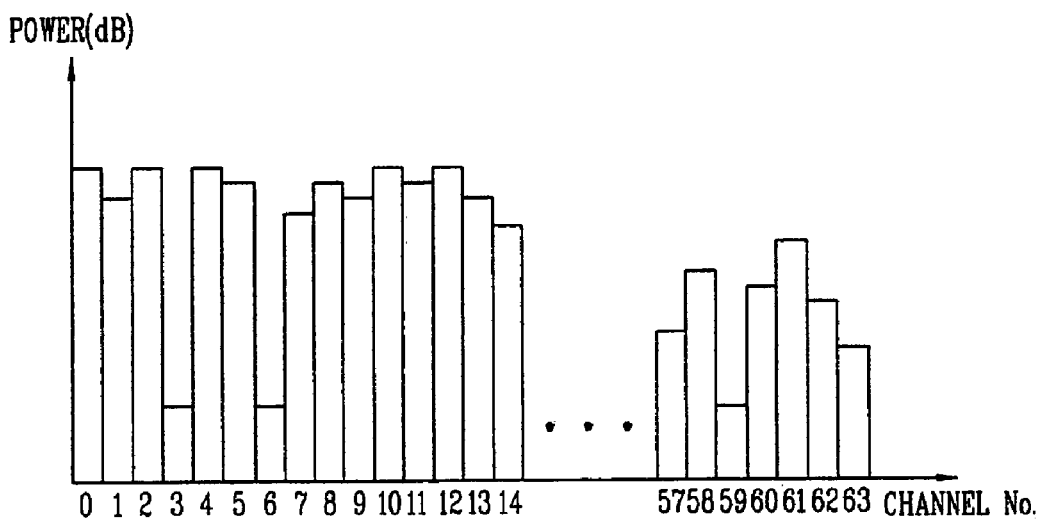
FIG. 2 is a graph showing a code domain power measurement obtained in a mobile communication system implementing a related-art CDMA method.
Figures 3, 4:
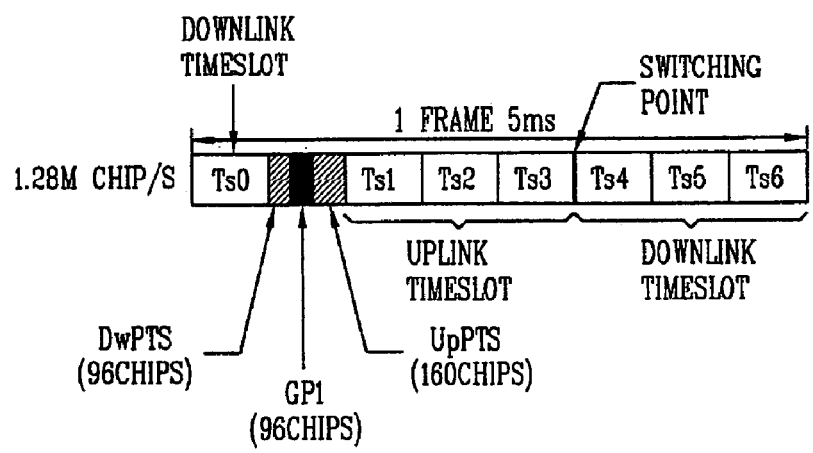
FIG. 3 is a graph showing a state of a channel allocated by a Walsh code length in a related-art CDMA method.
FIG. 4 is a diagram showing up/down link time slots of a TD-SCDMA which has been announced by the China Wireless Telecommunication Standard (CWTS) group.

FIG. 4 shows a configuration of up/down link time slots for a TD-SCDMA system as announced by the China Wireless Telecommunication Standard (CWTS) group. The CWTS proposed a standard of the TD-SCDMA, and for illustrative purposes the following description will be given based on Technical Specifications 3GPP TS 25.221 and a CWTS TSM 5.02, which are incorporated herein by reference.

As shown in FIG. 4, in the case of TD-SCDMA one frame is divided into 7 time slots (TS0-TS6) respectively allotted 675 μs of time. The frame also includes three special slots, namely a downlink pilot time slot (PwPTS), a guard period (GP), and an uplink pilot time slot (UpPTS), preferably disposed between time slots TS0 and TS1, which may always be fixed in this manner. The DwPTS, GP, and UpPTS slots are also not spread-demodulated into an orthogonal code and therefore are not to be estimated on a code domain. On the basis of a switching point, the front side is allocated to the uplink and the back side is allocated to the downlink.

Figure 5:
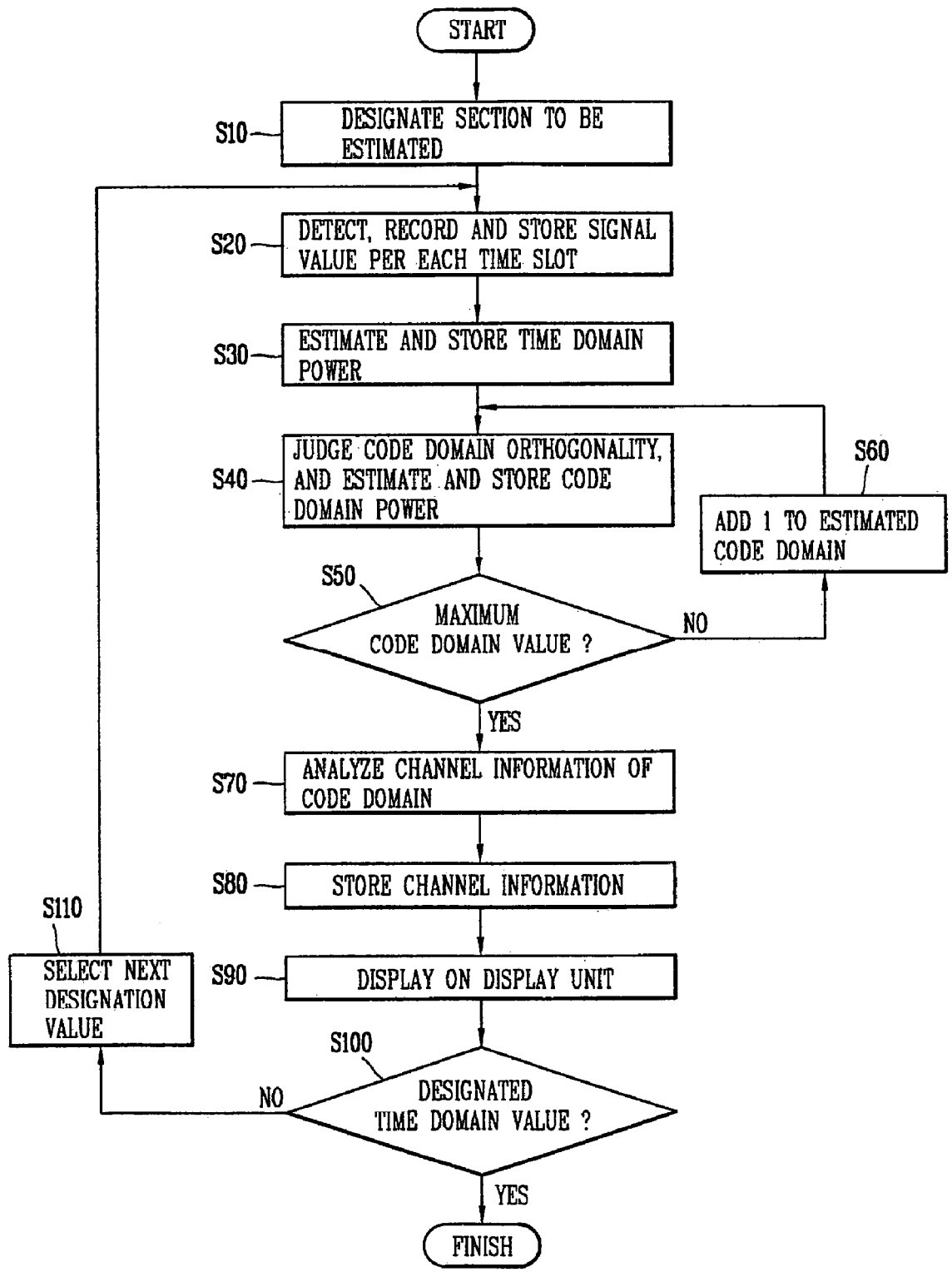
FIG. 5 is a flow chart showing steps included in a process for estimating power in a mixed wireless mobile communication system, which mixes TDMA and CDMA methods according to the present invention.

FIG. 5 is a flow chart showing steps included in a process for estimating power in a wireless mobile communication system which mixes TDMA and CDMA methods according to one embodiment of the present invention. Initially, a section is designated where system output power is to be estimated (S10). The estimation section designation may be performed, for example, by designating one of a base station and a mobile station or by designating both of them. A time domain estimation section divided into time slots is also designated.

Once the estimation section is designated, time domain power is estimated. A signal value per time slot inside the designated estimation section is detected, and temporarily recorded/stored at an inner memory of an estimation device (S20). Then, from the recorded/stored signal value for a corresponding time slot of the estimation section, an output power by time domain, that is, time domain power, is estimated and stored in the memory (S30).

Next, a wireless output for each code domain corresponding to the time domain is estimated. To this end, each time slot is divided into code channels. At this time, a spreading factor (SF) for one time slot is set preferably in accordance with a predetermined standard. For example, for TD-SCDMA, a maximum SF is set to 16 to thereby allocate 16 code channels for one time slot. Those skilled in the art can appreciate that other spreading factors may be used.

Then, an orthogonality of a corresponding code domain is judged to detect a channel number and to estimate a corresponding output power store (S40). SF denotes the number of chips per one data symbol in a channelization for converting all data symbols into the number of chips.

Next, it is determined whether the judged orthogonality is a maximum value of a communication channel by a maximum code domain or a Walsh code (S50). At this time, code channels per each time slot are distinguished by certifying an orthogonality with a reverse order of an orthogonal variable spreading factor (OVSF) code. Even if an SF shorter than maximum SF is allocated, each channel is distinguished and power of the distinguished channel can be estimated.

In judging the orthogonality of the code domain, if the orthogonality is not the value of the maximum communication channel, it is judged whether a code domain of which output power has not been estimated still exists. When this occurs, a value (e.g., 1) is added to a current code domain channel number (S60), and the step of judging orthogonality (S50) is again performed.

If the orthogonality is the value of the maximum communication channel, it is judged that output powers of all the code domains have been estimated. Accordingly, channel information of each estimated code domain is analyzed (S70). The channel information can be certified by a channel name, SF, code number, corresponding time slot number, etc., which will be displayed on a display unit. The SF and code number of each code channel may be certified by a received layer 3 message. This allows a code channel estimation time and name to be analyzed and written. When the analysis of the channel information is completed, the analyzed channel information is stored in the memory (S80).

Next, the estimation results are displayed on a display unit. The time domain power, code domain power, channel information, and the like which have been estimated and stored in the above steps are displayed on a display unit such as a liquid crystal display (LCD), a plasma display panel (PDP), a color-ray tube (CRT), a color display tube (CDT), a color picture ray tube (CPT), a multi display tube (MDT), a vacuum fluorescent display (VFD), and the like (S90). A channel name and other information constituting and/or relating to the channel information may be displayed by a user's selection, for example, by the user pressing a button or by a user reservation setting. The channel information is preferably displayed in a channel information box on the display unit as a letter. Also, time domain power is preferably displayed in dBm units, and code domain power is preferably displayed in dB units.

Next, it is judged whether a designated time domain which has not been estimated exists or not. This may involve determining whether the estimated time domain has a maximum designation value (S100). Based on a result of the judgment, if the estimated time domain does not have the maximum designation value, a time domain designation section to be estimated is selected next (S110). The system then returns to the step of detecting a signal value per time slot inside the designated estimation section and recording-storing in a corresponding buffer (S20), thereby repeatedly performing the subsequent steps. If the estimated time domain has a maximum designation value, it is judged that time domain powers and code domain powers of all sections have been estimated and displayed and thereby completion is performed.

Figure 6:
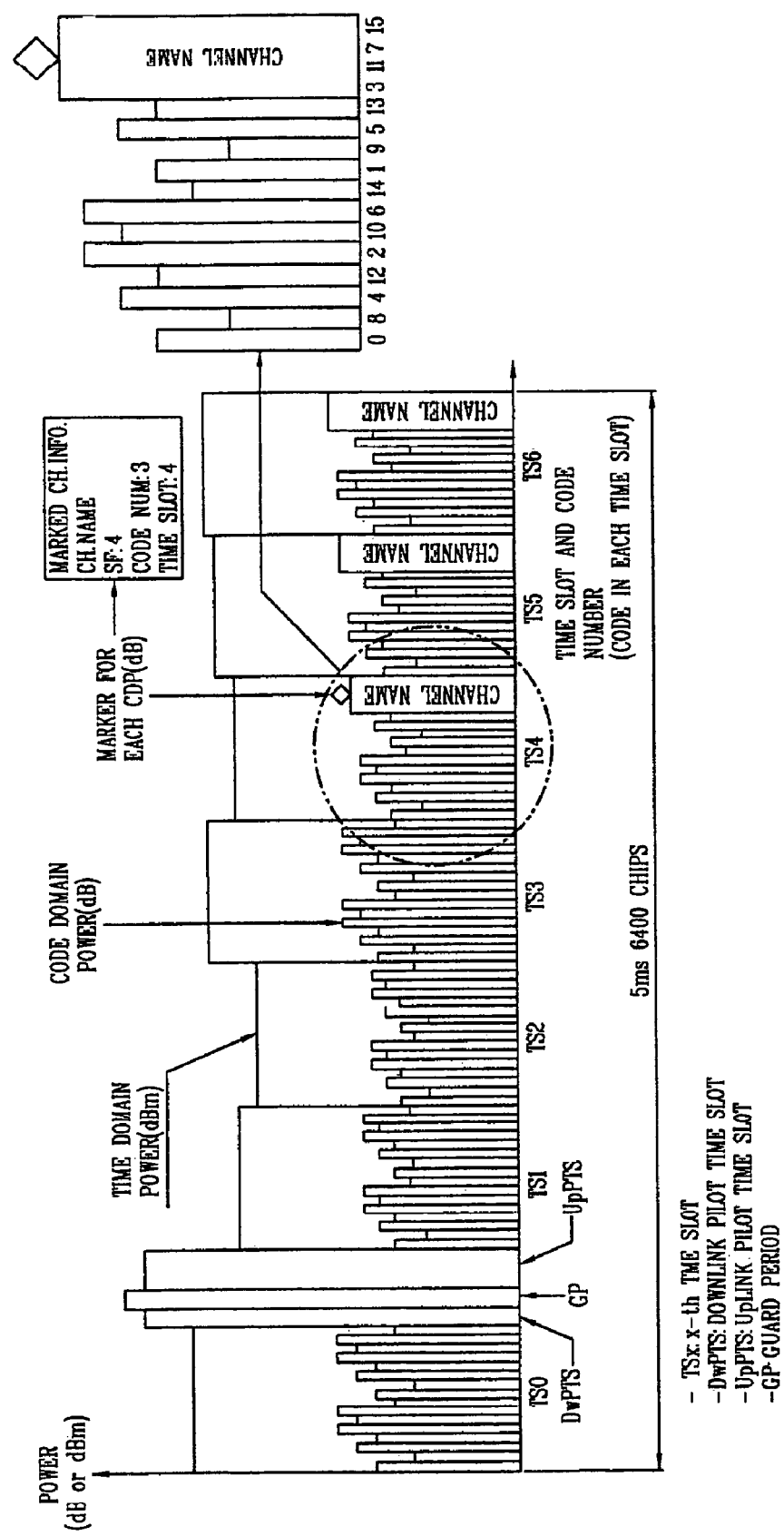
FIG. 6 is a graph showing a result displayed on a display unit generated by as one embodiment of a power estimating method implemented in a mixed wireless mobile communication system which mixes TDMA and CDMA methods according to the present invention.

FIG. 6 is an example of a graph showing displayed results that may be obtained according to one embodiment of a method for estimating power in a wireless mobile communication system which mixes TDMA and CDMA methods.

In this example, an estimation section of a 5 ms period is designated as one frame by the TD-SCDMA method and the one frame is divided into 7 time slots (TS0-TS6). Time slot TS0 is allocated as a downlink slot for transmitting data from a base station to a mobile station and the time slot TS1 is allocated as an uplink slot for transmitting data from a mobile station to a base station. The remaining time slots TS2-TS6 are preferably designated and allocated by a service operator, and therefore are elastically operated by a service intention and system operating characteristics of each service operator.

For example, in the case where TS2 and TS3 as well as TS1 are allocated as an uplink for transmitting data from a mobile station to a base station and TS4, TS5, and TS6 as well as TS0 are allocated as a downlink for transmitting data from a base station to a mobile station, at least one of the TS1, TS2, and TS3 is designated as a time division section when an estimation section is a mobile station section, and at least one of the TS0, TS4, TS5, and TS6 is designated as a time division section when an estimation section is a base station.

The time domain power for each time slot is estimated and stored. Each time slot is distinguished as a code channel, and 16 code channels are allocated to one time slot by setting a maximum SF 16 per one time slot. Also, an orthogonality of a corresponding code domain is judged by a reversed order of an OVSF code, to thereby detect a channel number, to estimate a corresponding output power (that is, a code domain power) and then the estimates are stored.

Next, channel information such as channel name, SF, code number, etc., is analyzed, and then the estimation result and channel information are displayed on the display unit. The estimated and stored time domain power, the code domain power, the channel information, the time slot number, etc., are preferably displayed as letters in the channel information box on the display unit as shown in FIG. 6. Other methods of display and/or designations are possible however. The channel name, etc., constituting the channel information can be displayed by a user's selection, for example, by the user pressing a button or by a user reservation setting, or this information may not be displayed at all. At this time, if the display unit is sufficiently large, the channel name may be displayed by being overwritten on a code channel power level. If the display unit is small, the information can be displayed separately only for a channel having a channel information box. The time domain power may be displayed in dBm units, and the code domain power may be displayed in dB units.

As previously mentioned, in the domain power estimating method of a wireless system according to the present invention, a method for estimating a code domain power on a time domain which was impossible in the related art is provided. This allows the time domain power and code domain power to be simultaneously estimated in a mixed system, such as but not limited to one which mixes TDMA and CDMA methods. Examples of these systems include TD-SCDMA and WCDMA TDD methods which are expected to be used in the future. The present invention will allow this power information to be easily viewed.

Also, a code domain power estimating method on a time domain proposed to estimate orthogonality and channel power of each of a plurality of channels, by estimating a peak code domain error per one time slot which is not present in the related art, is disclosed. The present invention may therefore be used as a barometer for a development technique in this field.

In the present invention, a method for selecting at least one time slot and displaying a code domain power and a time domain power corresponding to the time slot on the display unit, or a method for displaying only an average value of an uplink and a downlink can be also implemented.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalence of such metes and bounds are therefore intended to be embraced by the appended claims.

What is claimed is:

1. A power measuring method in a wireless system, comprising:

designating a section where an output power is to be measured;

measuring time domain power in the designated section;

measuring code domain power in the designated section; and displaying the measured time domain power and the code domain power simultaneously on a display unit, wherein measuring the code domain power includes:

dividing each of a plurality of time slots into code channels;

measuring orthogonality of a corresponding code domain;

distinguishing the code channels in each time slot based on a reverse order of an orthogonal variable spreading factor (OVSF) code, and then estimating code domain power of each of the distinguished code channels, wherein displaying the measured time domain power and code domain power on a display unit comprises:
- analyzing channel information of at least one code domain; and
- displaying the channel information on the display unit with the measured time domain power and code domain power.

2. The method of claim 1, wherein the section includes a base station section and a downlink section used at the same time for transmitting a signal and data from a base station to a mobile station.

3. The method of claim 1, wherein the section includes a mobile station section and an uplink section used at the same time for transmitting a signal and data from a mobile station to a base station.

4. The method of claim 1, wherein the section includes both a base station section and a mobile station section used at the same time.

5. The method of claim 1, wherein measuring the time domain power in the designated section comprises:
- detecting a signal value for each time slot of the designated section;
- storing the detected signal value in a memory; and
- estimating the time domain power using the stored signal value and the estimated time domain power.

6. The method of claim 5, wherein estimating the time domain power is performed based on an estimation unit that corresponds to one time slot.

7. The method of claim 1, wherein the orthogonality of the code domain is repeatedly measured until a code domain channel number, detected based on the measured orthogonality, at least substantially matches a value of a maximum length of code domain channel.

8. A power measuring method in a wireless system, comprising:
- designating a section where an output power is to be measured;
- measuring time domain power in the designated section;
- measuring code domain power in the designated section; and
- displaying the measured time domain power and the code domain power simultaneously on a display unit, wherein measuring the code domain power includes:
- dividing each of a plurality of time slots into code channels;
- measuring orthogonality of a corresponding code domain, and
- wherein displaying the measured time domain power and code domain power on a display unit comprises:
- analyzing channel information of at least one code domain; and
- displaying the channel information on the display unit with the measured time domain power and code domain power.

9. The method of claim 8, wherein the channel information includes at least one of a channel name of each code, a spreading factor, and a time slot number.

10. The method of claim 8, wherein the channel information is displayed as a letter or figure in a channel information box on the display unit.

11. The method of claim 9, wherein the channel name is displayed by an overwriting method on a code channel power level.

12. The method of claim 9, wherein the channel name is selectively omitted.

13. The method of claim 8, wherein the time domain power is displayed in dBm units.

14. The method of claim 8, wherein the code domain power is displayed in dB units.

15. The method of claim 8, wherein displaying the channel information on the display unit with the measured time domain power and the code domain power further comprises: displaying channel information of a corresponding time slot with a measured time domain power and a code domain power by selecting one time slot.

16. The method of claim 8, wherein displaying the channel information on the display unit with the measured time domain power further includes displaying only average values of each uplink and downlink.

17. The method of claim 16, wherein the average value is an average value of a power, which has been measured for a preset time.

18. The method of claim 1, wherein the wireless system is a mixed system of a TDMA system and a CDMA system.

19. The method of claim 1, wherein the section includes a base station section and a downlink section used at the same time for transmitting a signal and data from a base station to a mobile station.

20. The method of claim 1, wherein the section includes a mobile station section and an uplink section used at the same time for transmitting a signal and data from a mobile station to a base station.

21. The method of claim 1, wherein the section includes both a base station section and a mobile station section used at the same time.

22. The method of claim 8, wherein measuring the time domain power in the designated section comprises:
- detecting a signal value for each time slot of the designated section;
- storing the detected signal value in a memory; and
- estimating the time domain power using the stored signal value and the estimated time domain power.

23. The method of claim 22, wherein estimating the time domain power is performed based on an estimation unit that corresponds to one time slot.

* * * * *